United States Patent [19]

Makepeace et al.

[11] 3,900,021

[45] Aug. 19, 1975

[54] COUPLING FOR ENDOSCOPES AND INSTRUMENTS PARTICULARLY CAMERAS

[76] Inventors: Anthony Peter Walter Makepeace, Steep Acre, Tower House Ln., Wraxall, Bristol; Huw Bevan Griffith, 19 Kingsweston Rd., Henbury, Bristol, both of England

[22] Filed: July 3, 1973

[21] Appl. No.: 376,223

[30] Foreign Application Priority Data
July 4, 1972 United Kingdom............... 31295/72

[52] U.S. Cl.............................. 128/4; 403/DIG. 1
[51] Int. Cl.............................................. A61b 1/04
[58] Field of Search .................. 128/3, 4, 6, 7, 8; 403/182, 184, 287, 296, DIG. 1, DIG. 4

[56] References Cited
UNITED STATES PATENTS

| | | | |
|---|---|---|---|
| 2,280,561 | 4/1942 | Wappler | 128/7 X |
| 2,623,256 | 12/1952 | Feibelman | 403/DIG. 1 |
| 2,678,228 | 5/1954 | Gerhardt | 403/DIG. 1 |
| 2,936,753 | 5/1960 | Storz | 128/6 |

FOREIGN PATENTS OR APPLICATIONS 514,102   6/1955   Canada.......................... 403/DIG. 1

*Primary Examiner*—Richard A. Gaudet
*Assistant Examiner*—Henry S. Layton
*Attorney, Agent, or Firm*—Thompson, Birch, Gauthier & Samuels

[57] ABSTRACT

An endoscope is coupled to a camera or other instrument by means of magnetic attraction so that the endoscope and instrument can rotate relative to each other and separate readily if a patient under examination jerks suddenly.

2 Claims, 2 Drawing Figures

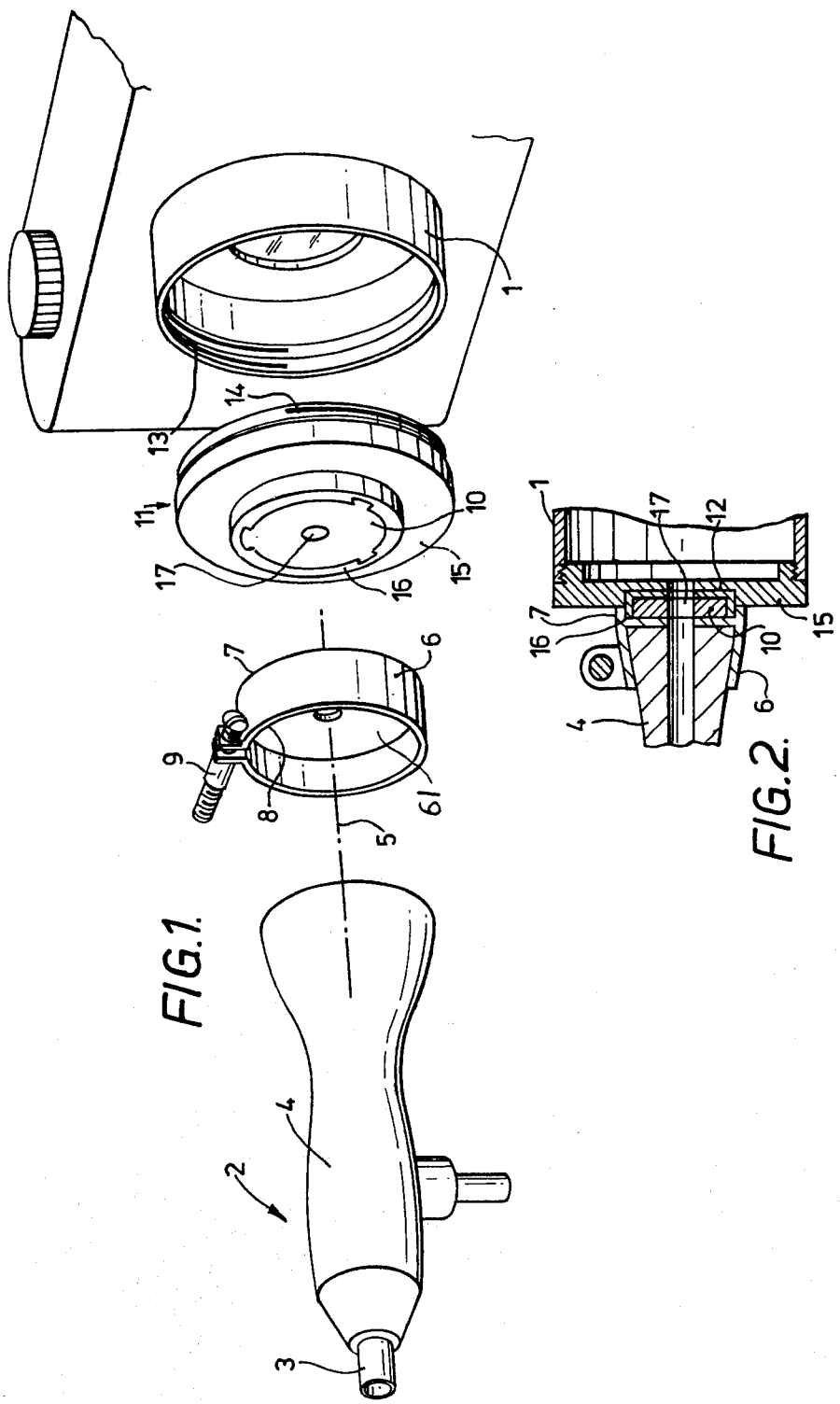

COUPLING FOR ENDOSCOPES AND INSTRUMENTS PARTICULARLY CAMERAS

BACKGROUND OF THE INVENTION

Endoscopes, such as those described in British Pat. Nos. 954,629 and 1,311,018, have long been known in the art of surgical examination. A typical endoscope has an elongate probe portion which terminates rearwardly in a flared collar portion. The endoscope may incorporate a surgical telescope, the eyepiece of which is disposed within the flared collar portion. When a patient is being examined internally, it is sometimes desired to fit a camera to the endoscope so that the results of the examination may be recorded. Usually the camera will be a still photographic camera but it may be a cinematographic camera or a television camera. Again, it may be desired to fit to the endoscope a teaching attachment so that a student may participate in the examination being carried out by a surgeon, or some other instrument. The endoscope and the other instrument each have an optical axes and the two axes must be maintained in proper alignment by whatever device is used to couple the two instruments together.

Various devices are known at the present time for coupling together an endoscope or other instrument. One such device is in the form of a clip which is tightened by operating a screw while another requires a catch to be operated to bring about the connection. One disadvantage of these known devices is that it is difficult to maintain sterility because of the need to manipulate the screw or catch during assembly or disassembly. This problem has been overcome by providing the endoscope with a tapered end portion which is received within a tapered receptacle carried by the lens surround. The cooperating parts have a taper angle of about 15° and are about one-half inch in length. This construction, however, like the others referred to above suffers from another major disadvantage, namely that the endoscope and camera are coupled together relatively rigidly. As a result, the patient may be injured if he should jerk suddenly during examination. In addition, the endoscope, which is a very expensive instrument, may break.

So far as we are aware, no inventor has hitherto solved this problem.

According to our invention, we use magnetic attraction to couple the endoscope and camera or other instrument. The advantages of this arrangement are that the two instruments may be assembled and disassembled readily without it being necessary to manipulate screws or catches, free rotation of the endoscope relative to the camera may take place, and the coupling separates readily and immediately the patient jerks. We have used the coupling of the invention during actual examination of hospital patients over a prolonged period of time and found it to be extremely satisfactory.

We do not deny that it is known in other fields to use magnetic attraction to couple together various components but to the best of our knowledge we are not aware of this principle having been used to couple together an endoscope and camera, with the object of achieving a separation of the coupling to avoid injury to a patient and damage to the endoscope.

One practical result of the invention is that a simplified form of coupling device is made possible. We prefer to use in this connection a fitting which screws into the lens surround of the camera and incorporates a permanent annular magnet. The endoscope is then fitted with an annular clip of a magnetic material which is fastened over the flared eye piece end of the endoscope, and which serves as a keeper for the magnet.

However, it falls within the scope of our invention for the endoscope to incorporate magnetic parts so that the clip is rendered superfluous. Also, of course, the magnet may be incorporated in the endoscope or in the instrument itself, thereby rendering any fittings whatsoever unnecessary.

Although a permanent magnet is preferred because of simplicity, electromagnets or other magnets may be used as an alternative.

DESCRIPTION OF THE DRAWINGS

FIG. 1 shows in a perspective, exploded view parts of a camera and an endoscope, and a preferred embodiment of a coupling therefore, and FIG. 2 shows in axial section, the parts assembled.

DESCRIPTION OF PREFERRED EMBODIMENT

As shown in the drawing, a camera has a front lens surround 1, having an internal screw thread 13 whilst an elongate endoscope 2 has a probe like portion 3 (only part of which is shown) terminating in a collar 4 incorporating an eye piece. The endoscope and the camera have respective optical axes which must coincide exactly with the axis 5 when the two instruments are coupled together. Upon rotation of the endoscope relative to the camera about the axis 5, the angle of view obtained at its outer end can be altered with the type of endoscope disclosed in British specification No. 954,629.

The coupling device for securing the endoscope to the camera has a clip 6 with an annular end wall 61 which has on one side a circular lip 7 and on its other side a circular split side wall or flange 8 with a tightening screw 9 interconnecting the two parts of the flange. The flange 8 can be fitted over the flared end part of the collar 4 of the endoscope, and the screw 9 tightened to make the flange 8 tightly embrace the collar 4.

A fitting 11 is in the form of an annular plate 15 provided with an external screw thread 14 which cooperates with the screw thread 13 to allow the fitting to be screwed into the lens surround 1. The plate 15 has a recess into which is fitted a dished pole piece 12 in which is fitted an annular steel pot magnet 10. The front edge of the rim of the pole piece stands proud of the front surface of the plate to form a rib 16.

The plate 15 has a central aperture 17 which registers with the aperture in the magnet to provide an unobstructed optical path along the axis 5 when the parts are assembled.

The fitting 11 may of course be provided with any suitable device to enable it to be fitted to the surround 1, as an alternative to the screw fitting illustrated.

When the parts 6 and 11 are brought together, the clip 6 serves as a keeper for the magnet, the clip 6 preferably being made of magnetic stainless steel to permit sterilization. The lip 7 fits around the rib 16 to limit relative side to side motion of the two parts. Because the rim of the pole piece has one polarity throughout its periphery, relative rotation of the two fittings can take place without magnetic obstruction.

It will be appreciated that the clip 6 could be secured to the endoscope by other means, or alternatively may be omitted altogether provided the eye piece end of the endoscope includes a ferromagnetic part. Likewise, a magnet may be built permanently into the instrument to which the endoscope is to be fitted.

As an alternative, the magnet may be incorporated in the clip 6 or permanently in the eye piece end of the endoscope instead of in the fitting 11, or both the clip 6 and the fitting 11 may incorporate magnets. The cooperating parts may have complementary tapers to assist assembly. Other modifications may be made within the spirit and scope of the invention and it is not intended to restrict the invention to use with endoscopes. Other instruments such as microscopes and cameras may be assembled effectively using the invention.

What we claim is:

1. In combination, an endoscope having an elongate probe portion and a collar at the rearward end of the probe portion, said collar having a rearwardly flared end part, a camera having a lens surround, said lens surround being internally threaded, a first component comprising a clip having an annular end wall and a side wall shaped to embrace at least part of the rearwardly flared end part of the collar portion, said side wall being split and being provided with screw means whereby it may be tightened about the rearwardly flared end part of the collar portion, said first component being formed from a magnetic material, and a second component having an end wall with an external screw thread adapted to screw into the lens surround and having a central aperture, a recess in the end wall, and an annular permanent magnet fitted within the recess with the aperture in the magnet in line with the aperture in the end wall, wherein the recess in which is disposed the magnet is defined within a circular rib and the clip has a circular lip defining a relatively wide shallow cavity, the lip being adpated to embrace the rib and to limit relative movement of the endoscope and camera in the transverse direction, while at the same time permitting separation of the endoscope and camera in response to jerking by a patient.

2. The combination claimed in claim 1, including a dished pole piece in which said magnet is received said pole piece having a rim, the forward edge of which constitutes said rib.

* * * * *